United States Patent [19]

DeMan et al.

[11] 4,326,293
[45] Apr. 20, 1982

[54] TRANSMITTER-RECEIVER WITH AUTOMATIC ALTERNATION CONTROL

[75] Inventors: Pierre DeMan; Alberto Pimentel; Jean-Claude Ben Sadou; Charles de Riviere, all of Paris, France

[73] Assignee: Thomson-CSF, Paris, France

[21] Appl. No.: 138,509

[22] Filed: Apr. 9, 1980

[30] Foreign Application Priority Data

Apr. 13, 1979 [FR] France ............................ 79 09491

[51] Int. Cl.³ .................... H04B 1/64; H04B 1/46
[52] U.S. Cl. .................................. 455/72; 455/79; 375/7
[58] Field of Search ............... 455/78, 79, 80, 82, 455/83, 72, 62, 49; 375/7-9; 370/32, 7; 333/14

[56] References Cited

U.S. PATENT DOCUMENTS 3,397,401 8/1968 Winterbottom ...................... 455/79
3,882,458 5/1975 Hoeschele, Jr. et al. ............ 375/8
4,034,295 7/1977 Kotezawa et al. .................... 455/72
4,123,711 10/1978 Chow ................................... 455/72

FOREIGN PATENT DOCUMENTS 2128889 1/1973 Fed. Rep. of Germany .
461585 10/1968 Switzerland .

OTHER PUBLICATIONS

Electron, vol. 29, No. 4, Apr. 1973, Rotterdam (NL), J. Hoek: "De Trio zendontvanger", Serie 515—pp. 160-164.

Primary Examiner—Jin F. Ng
Attorney, Agent, or Firm—Cushman, Darby & Cushman

[57] ABSTRACT

Prior to each voice activity period, the transmitter supplies a digital preamble for coding the speech signal levels and during these periods high frequency signals modulated in substantially constant amplitude, but transmits nothing other than said preamble and said periods. On reception, a signal detector and logic elements control a switch to obtain only speech signals at the input of an attenuator. The preamble decoding circuit controls the attenuation value of the attenuator in order to resupply to the receiver output signals of the same relative level as those applied to the transmitter input.

14 Claims, 3 Drawing Figures

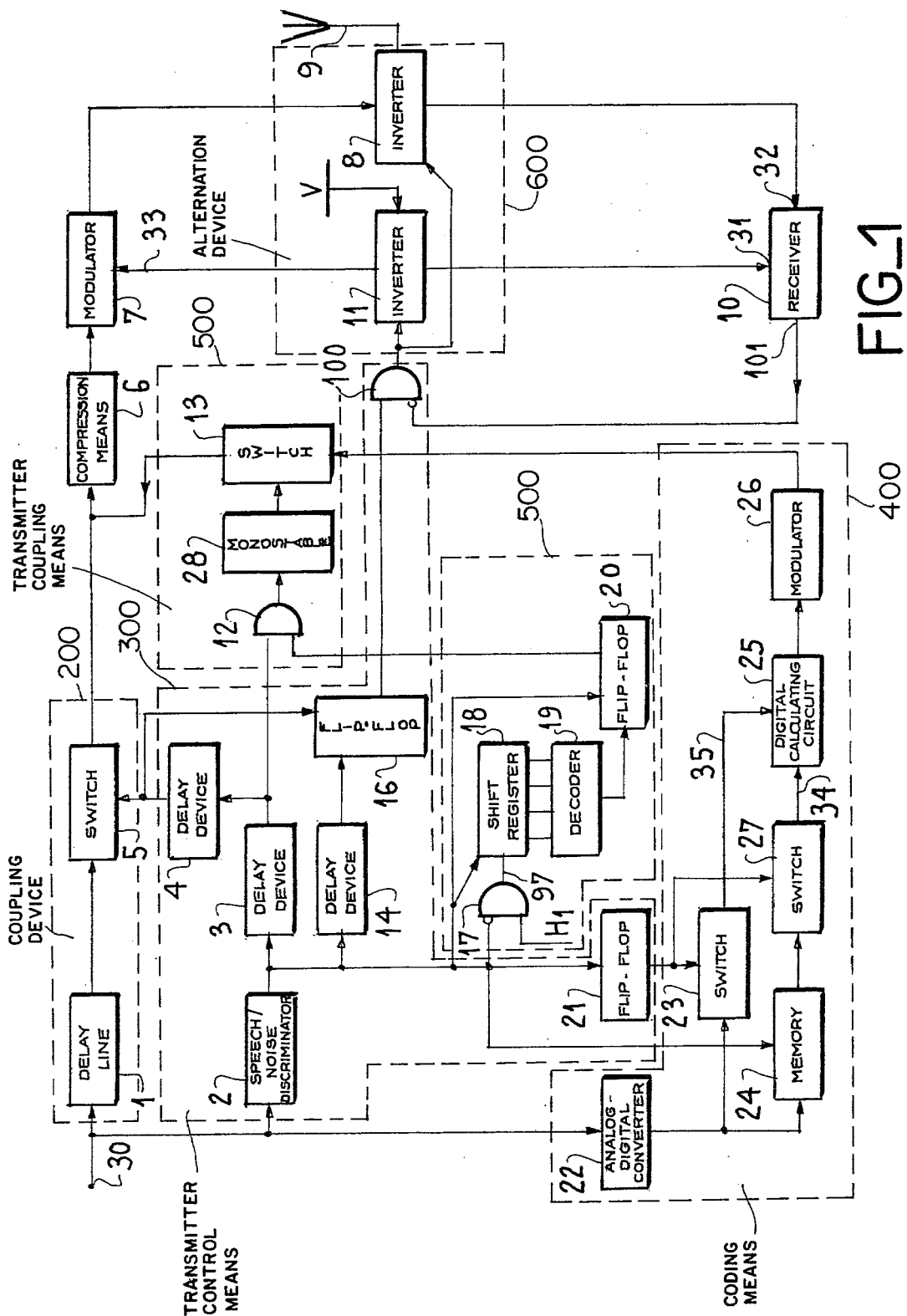

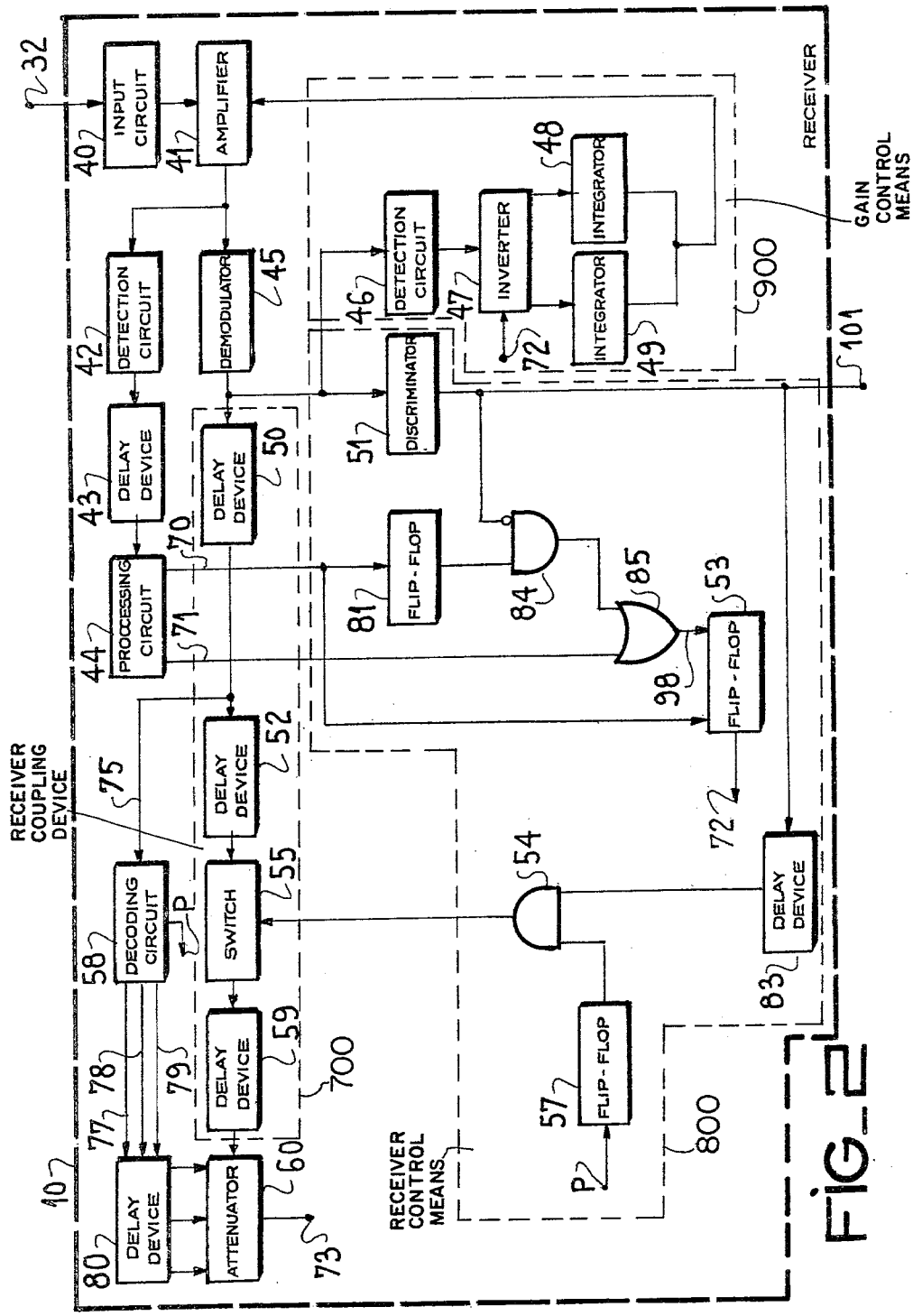

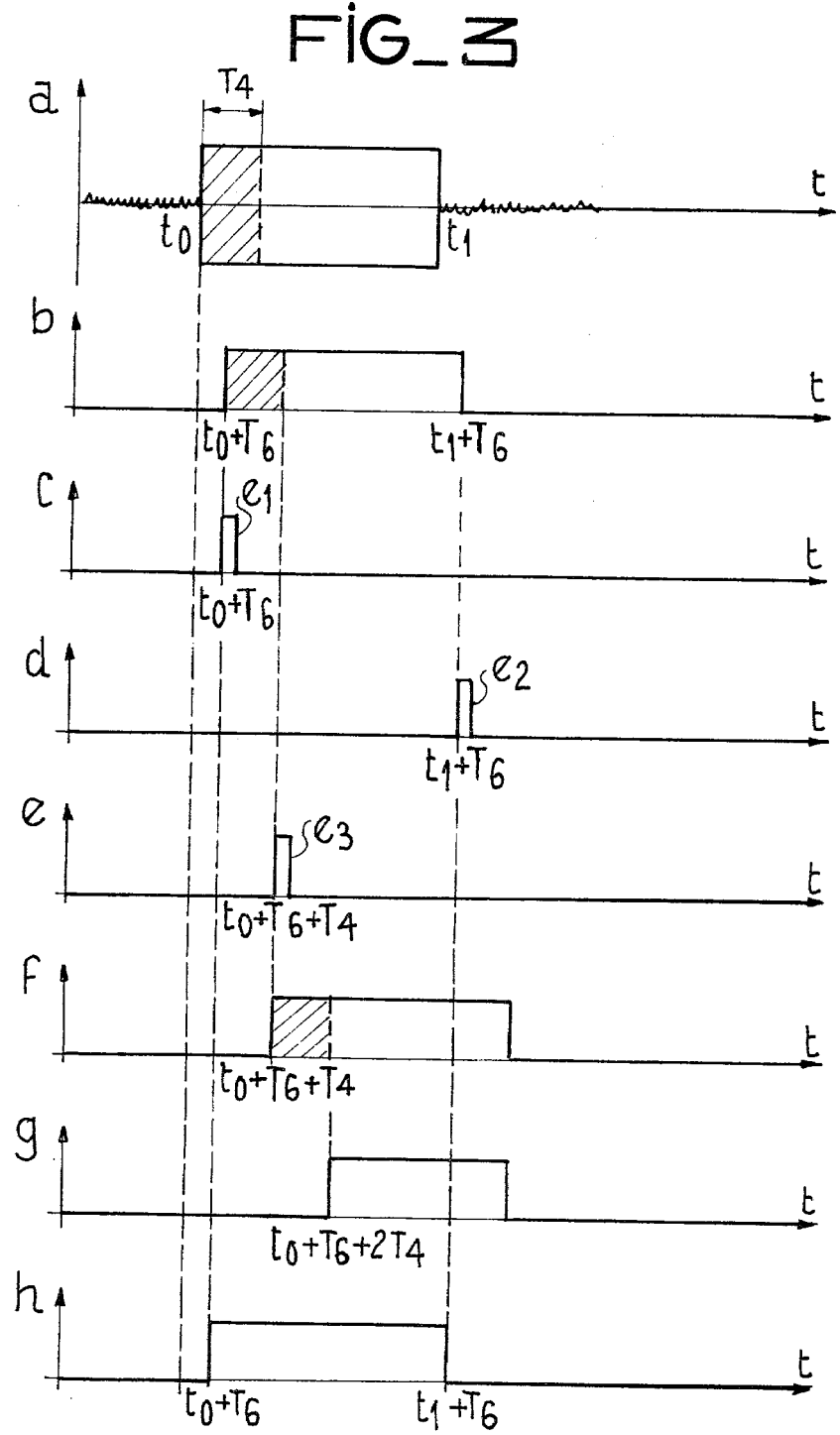

4,326,293

TRANSMITTER-RECEIVER WITH AUTOMATIC ALTERNATION CONTROL

BACKGROUND OF THE INVENTION

The present invention relates in general to communication systems using transmitters-receivers having automatic alternation control. Such transmitters-receivers operating with single sideband amplitude modulation and incorporating in the transmitter part thereof means for compressing the amplitude of voice modulation signals therein and in the receiver part a voice-noise discriminator for eliminating noise between voice activity periods are known.

At the output of the receiver's demodulator, such known transmitters-receivers provide voice signals of substantially constant amplitude and therefore do not accurately reproduce the changing amplitude levels of voice signals modulating the transmitter.

BRIEF SUMMARY OF THE INVENTION

Therefore, the present invention provides a novel transmitter-receiver arrangement for accurately reproducing, at the receiver, the changing amplitude levels of an input signal to the transmitter. In the transmitter, the mean value of the amplitude of a voice input signal over a voice activity period. This value is coded and transmitted as a preamble to the voice signal. In the receiver, a preamble decoding circuit controls the alternation value of an attenuator to reproduce the mean value amplitude transmitted.

According to the invention, there is provided a transmitter-receiver incorporating an automatic alternation device having a control input and in which the transmitter has a signal input, a coupling device having a control input, amplitude compression means having an input coupled to the signal input by the coupling device, control means coupled to the receiver having an input coupled to the signal input, a first output coupled to the control input of the coupling device, a second output coupled to the control input of the automatic alternation device and a third output, means for coding in each voice activity period the amplitude of the signals received by the signal input having an input coupled to the signal input, a control input coupled to the third output of the control means and an output and coupling means for coupling the output of the coding means to the input of the compression means coupled to the control means and in which the receiver has an input, an output, an amplifier circuit having an input coupled to the input of the receiver and an output, a demodulator having an input coupled to the output of the amplifier circuit and an output, a coupling device having an input coupled to the output of the demodulator, a first output coupled to the output of the receiver, a second output and a control input, an attenuator having an input coupled to the first output of the coupling device of the receiver, an output coupled to the output of the receiver and a control input, a decoding circuit coupled to the second output of the coupling device of the receiver having a first output coupled to the control input of the attenuator and a second output, control means coupled to the transmitter having a first and second input respectively coupled to the input and output of the demodulator and an output coupled to the control input of the coupling device of the receiver.

BRIEF DESCRIPTION OF THE DRAWINGS

The invention is described in greater detail hereinafter relative to non-limitative embodiments and the attached drawings, wherein:

FIG. 1 a circuit diagram of a transmitter-receiver construction according to the invention.

FIG. 2 a detailed diagram of the receiver block shown in FIG. 1.

FIG. 3 timing diagrams of various signals explaining the operation of the invention.

DETAILED DESCRIPTION OF THE PREFERRED EMBODIMENTS

Throughout the drawings, like or similar elements are noted by the same reference numerals.

In FIG. 1, an input terminal 30 for receiving a voice signal to be transmitted is connected to the inputs of a speech/noise discriminator 2, an analog-digital converter 22 and a delay line 1. The output of delay line 1 is coupled through a first electronic switch 5 and series-arranged compression means 6 to a modulator 7. The output of the speech/noise discriminator 2 is connected in parallel to (a) the input of a first delay device 3, whose output supplies a second delay device 4 and a first input of an AND gate 12, (b) to the input of a third delay device 14 whose output supplies the "setting to 1" input of a flip-flop circuit 16, (c) to the reading control input of a shift register 18, (d) to the timing input of a flip-flop 20, (e) to a first complementary input of AND gates 17, to the storage control input of a memory 24 and (f) to the input of a monostable flip-flop 21. The output of flip flop 21 is connected to the control inputs of a second electronic switch 27 and a third electronic switch 23. A timing signal $H_1$ of frequency 1 kHz supplies the second input of AND gate 17, whose output is connected to the signal input 97 of the shift register 18. Shift register 18 has four stages with four outputs respectively connected to four inputs of a decoder 19, whose output is connected to the second input of the AND gate 12 across flip-flop 20. The output of the analog-digital converter 22 is connected to a first input 34 of a digital calculation circuit 25 across memory 24 and electronic switch 27 and to a second input 35 of the digital calculating circuit 25 across electronic switch 23. The output of the digital calculation circuit 25 is connected to the input of the compression means 6 across a modulator 26 in series with a fourth electronic switch 13. Switch 13 is controlled by the output signal of a monostable circuit 28, whose input is connected to the output of the AND gate 12. Electronic switch 5 is controlled by the output of the second delay device 4, which is connected to the zeroing input of the flip-flop circuit 16.

The output of flip-flop circuit 16 is connected to the first input of AND gate 100, whose second complementary input is connected to the ouput 101 of receiver 10.

The output of AND gate 100 is connected to each of the control inputs of two electronic inverters 8 and 11. Electronic inverter 8 makes it possible to connect an antenna 9 either to the output of the system of modulator 7 or to the signal input 32 of a receiver 10. Electronic inverter 11 makes it possible to switch a voltage source V either to the supply input 31 of receiver 10 or to the supply input 33 of modulator 7. The delay line 1 and the first switch 5 constitute the coupling device of the transmitter referred to by reference numeral 200. The speech/noise discriminator 2, the delay devices 3, 4 and 14, the flip-flop circuit 16, the monostable flip-flop 21 and the AND gate 100 constitute the transmitter control means referred to by reference numeral 300. In the same way, the analog-digital converter 22, switches 27 and 23, memory 24, digital calculation 25 and modulator 26 form the coding means referred to by reference numeral 400. The transmitter coupling means referred to by reference numeral 500 are constituted by the AND gate 12, the monostable circuit 28, the fourth switch 13, the AND gate 17, the shift register 18, the decoder 19 and the flip-flop 20. Finally, the electronic inverters 11 and 8 constitute the alternation device referred to by reference numeral 600.

The transmitter of the transmitter-receiver functions in the following manner. The analog-data received at the input terminal 30 are sampled and converted into binary signals by the analog-digital converter 22. In the case where the analog data received are voice signal, the mean value of the amplitude of these voice signals is calculated at the output of the analog-digital converter. This mean value is then coded and used in the digital preamble of the voice signals to be transmitted.

The speech/noise discriminator 2 supplies a logic signal to its output, whose state 1 characterises the presence of voice activity on input terminal 30. Hereinafter, PAV and $\overline{PAV}$ will respectively designate this signal at state 1 and at state 0. The duration of signal PAV is equal to that of the voice message received at terminal 30 and that of signal $\overline{PAV}$ to the absence thereof, but these signals are delayed by a time $T_1$ compared with the message ($T_1$ representing the time necessary for processing the PAV signal).

The analog signals received at terminal 30 are sampled and converted into binary signals by the analog-digital converter 22. Memory 24 permanently stores the binary samples supplied by the analog-digital converter 22 during the period $T_1$. The content of this memory is validated by the PAV signal supplied by discriminator 2 which, by means of monostable circuit 21 initiates a logic state 1 of duration $T_2$ starting from the PAV-$\overline{PAV}$ transition, the closing of electronic switches 23 and 27 during this time $T_2$ and the transfer of the content of the memory 24 into the digital calculation circuit 25 ($T_2$ is the time necessary for the transfer of the content of memory 24 into digital calculation circuit 25). During time $T_2$, circuit 25 also receives the binary samples supplied by converter 22 across electronic switch 23 and during the period $T_3$ carries out the calculation of the mean numerical value of the signal binary samples received at its two inputs 34 and 35 ($T_3$ is the time necessary for the calculation carried out by the digital calculation circuit 25). The mean value is coded and transmitted as a frequency shift keyed preamble to a voice message.

In order that the transmitter can transmit a voice message preceded by its preamble, it is necessary to determine whether the silence preceding the message has an adequate duration to contain the preamble. The preamble requires a time $T_4$ equal to 10 ms in the present construction. For this purpose, the AND gate 17, open during the time of the $\overline{PAV}$ signal (signifying an absence of a voice message at input terminal 30) permits the passage of timing signals $H_1$ of frequency 1 kHz which are transferred into shift register 18. This register is incremented every millisecond and for a duration of the $\overline{PAV}$ signal equal to 10 ms the number of timing pulses recorded is equal to the binary number 1010. When the number of timing pulses recorded is equal to 1111, the register stored this value. During the $\overline{PAV}$-PAV transition of the output signal of discriminator 2 the AND gate 17 closes and the register content is transferred into decoder 19 (under the action of the $\overline{PAV}$-PAV transition applied to the reading input of the register). Decoder 19 supplies a logic 1 state if the binary number received is equal to or greater than 1010 and a zero state if this is not the case. This logic state is stored in flip-flop 20 during the $\overline{PAV}$-PAV transition of the output signal of discriminator 2 (due to the fact that said transition is applied to the timing input of flip-flop 20). This logic state is reproduced at the output of flip-flop 20, thus making it possible to open the AND gate 12 up to the following $\overline{PAV}$-PAV transition of the output signal of discriminator 2.

The delay device 3 has a delay equal to $T_2+T_3$, at the end of which the output signal of discriminator 2 is applied to the first input of the AND gate 13, thus authorising the passage to state 1 of the output signal of said gate. Said state 1 permits the monostable circuit 28 to generate a state 1 signal for a duration of 10 ms at its output. This control the closing of electronic switch 13, making it possible to apply the preamble to the input of the compression mains 6.

The delay of delay line 4 is equal to $T_4$ in such a way that the closing of switch 5 occurs at the end of a total time $T=T_1+T_2+T_3+T_4$ following the appearance of the voice signal at input terminal 30. It is this time T which is allocated to the delay line 1 and at the end of which the voice signal is transmitted to compression device 6 and then to the system of transmission circuits 7. The switch 5 is closed when PAV is present.

After a time $T_2+T_3-T_5$ corresponding to the delay devolving upon the delay device 14 ($T_5$ representing the switching and voltage application time of the system of circuits 7 and $T_2+T_3$ representing the calculation time required by circuit 25) the $\overline{PAV}$-PAV transition of the signal at the output of the speech/noise discriminator 2 leads to the bringing into state 1 of a first signal obtained at the output of flip-flop circuit 16, whilst the opposite transition PAV-$\overline{PAV}$ leads to the bringing into state 0 of said first signal with a delay $T_2+T_3+T_4$ due to the delay devices 3 and 4. The output 101 of receiver 10 supplies a second signal which is in state 1 when voice signals are detected by the receiver and to state 0 in the opposite case. The first signal is transmitted to the first input of the AND gate 100, whose second complementary input receives the second signal. The output of said AND gate 100 thus supplies a third signal of logic level 1 (with a delay $T_1+T_2+T_3-T_5$) only when the voice signals are received by terminal 30 at the transmitter and when receiver receives no signal. This third signal is transmitted to the control input of converters 11 and 8 which effect an automatic alternation switching by connecting antenna 9 and supply voltage source V respectively to the output and to the input 33 of the system of circuit 7 during the state 1 of said signal and by connecting these same elements respectively to the inputs 32 and 31 of receiver 10 during state 0 of said signal.

Receiver 10 is described in detail hereinafter. FIG. 2 shows a signal input 32 connected to the input of a demodulator 45 across an input circuit 40 followed by an intermediate frequency amplifier 41 having a gain control input.

The output of demodulator 45 is connected to the output 73 of receiver 10, successively across a fourth delay device 50, a fifth delay device 52, a fifth electronic switch 55, a sixth delay device 59 and an attenuator 60 connected in series. This output of demodulator 45 is also connected to the input of a detection circuit 46, whose output is connected across an electronic inverter 47 having a control input 72 to the input of one or other of the integrators 48 and 49, whose outputs are connected to the gain control input of amplifier 41.

The output of amplifier 41 is also connected to the input of a processing circuit 44 across a detection circuit 42 and a seventh delay device 43. Outputs 70 and 71 of circuit 44 respectively supply a first input of a flip-flop 53 and a first input of an OR gate 85, whose second input is connected to the output of the AND gate 84 and whose output is connected to the second input 98 of flip-flop 53. The output of flip-flop 53 is connected to control input 72 of electronic inverter 47. The first input and the second complementary input of the AND gate 84 are respectively coupled to the first input of flip-flop 53 across a monostable flip-flop 81 and to the output of demodulator 45 across a discriminator 51. The output of discriminator 51 is also coupled to the first input of an AND gate 54 across an eighth delay device 83 and to the output 101 of the receiver 10 of FIG. 1. The second input and the output of AND gate 54 are respectively coupled to an output P and a decoding circuit 58 across a monostable flip-flop 57 and to the control input of switch 55.

Decoding circuit 58 has an input 75 connected to the output delay device 50 and three outputs 77, 78 and 79 respectively coupled to three control inputs of attenuator 60 across a ninth delay device 80.

It is pointed out that the fifth switch 55 and the delay devices 50, 52 and 59 constitute the coupling device of the receiver referred to by reference numeral 700.

In the same way, the speech/noise discriminator 51, the delay device 83, the AND gates 84 and 54, the OR gate 85, the flip-flop 53, the monostable flip-flops 57, 81, the detection circuit 42, the delay device 43 and the processing circuit 44 form the control means of the receiver referred to by reference numeral 800. The gain control means of amplifier 41 referred to by reference numeral 900 are constituted by the detection circuit 46, the electronic inverter 47 and integrators 48 and 49.

The operation of the receiver will be better understood by means of the voltage-time diagrams described hereinafter.

FIG. 3 show as a function of time T the amplitudes a, b, c, d, e, f, g and h of the signals respectively present at the output of the intermediate frequency amplifier 41, at the output of discriminator 51, at the outputs 70 and 71 of processing circuit 44, at the output 76 of decoding circuits 58, at the output of delay device 83, at the output of the AND gate 54 and at the output of flip-flop 53.

The voice signals received at inputs 32 are transmitted to demodulator 45 across the input circuit 40 and the intermediate frequency amplifier 41. The output signals of amplifier 41, constituted by waves modulated in amplitude and in frequency respectively with reference to the amplitude and frequency of the voice signals transmitted are represented by signal a in FIG. 3 having a wave train during a time period $t_1$-$t_0$ and noise outside this period, the hatched portion representing the digital preamble of duration $T_4$ ($T_4=10$ ms). Circuit 42 detects rapid amplitude transitions and supplies positive or negative pulses depending on whether the transitions are of the noise-signal or signal-noise type. After a delay $T_6$ due to the delay device 43, these pulses are then applied to the input of processing circuit 44, which supplies a positive pulse $e_1$ to output 70, symbolized by the signal c of FIG. 3, when it receives a positive pulse corresponding to the start of a message received by antenna 9 and supplies a positive pulse $e_2$ to output 71 (signal d of FIG. 3) when it receives a negative pulse (corresponding to the end of a message received by antenna 9).

The positive pulse $e_1$ from output 70 is applied to the first input of flip-flop 53, which enables the latter to generate at its output the logic signal of state 1h, which remains there for as long as pulse $e_2$ supplied by the output 71 of circuit 44 is not applied to the second input across the OR gate 85.

Discriminator 51 (functioning like discriminator 2 in FIG. 1) supplies, on the basis of signals provided by the output of demodulator 45, logic signal b synchronous with the signal h supplied by flip-flop 53. The delay $T_6$ of device 43 is equal to the time necessary for processing the output signal of this discriminator 51. The output signal of the latter makes it possible as a result of the AND gate 84 to validate the state 1 of the logic output signal of flip-flop 53.

Thus, monostable circuit 81 with its control input connected to output 70 supplies a logic level 0 for 10 ms when pulse $e_1$ appears, which blocks the AND gate 84 for 10 ms, i.e. up to the time $t_0+T_6+T_4$ ($T_4=10$ ms).

In the case where pulse $e_1$ is due to noise, (not shown) which does not correspond to the start of a meassage, the signal obtained at the output of discriminator 51 is in logic state 0. This signal is applied to the second complementary input of AND gate 84 and at time $t_0+T_6+T_4$ causes the output signal of AND gate 84 to pass from state 0 to state 1. This change of state applied to the second input 98 of flip-flop 53 across the OR gate 55 brings about the zeroing of the signal obtained at the output of said flip-flop. Switch 47 is then controlled only for 10 ms.

In the case of the drawing, where the pulse $e_1$ corresponds to the start of a meassage, the output of discriminator 51 is in logic state 1 at time $t_0+T_6+T_4$. Thus, the AND gate 64 remains blocked and flip-flop 53 is not zeroed. Switch 47 is controlled by signal h obtained at the output of said flip-flop, whereof the duration of state 1 is equal to the duration of the vocal message received on antenna 9.

The output P of decoding circuit 58 supplies the signal of amplitude e constituted by a pulse $e_3$ at time $t_0+T_6+T_4$ when it has detected a preamble, which makes it possible to find that the monostable circuit 57 generates at its output a signal in logic state 0 for 10 ms starting from said instant. AND gate 54 thus remains blocked between $t_0+T_6+T_4$ and $t_0+T_6+2T_4$ and generates the signal g in FIG. 3 as from signal f, which represents the signal b delayed by $T_4$ by the delay device 83. This signal g, of logic level 1 only during the voice signals without the digital preamble controls the closing of switch 55. As the signal supplied to the input of this switch are also delayed by $T_6+T_4$ by the delay device 50 (delay $T_6$) and delay device 52 (delay $T_4$) the signals supplied at the input of delay device 59 are only voice signals without a digital preamble. The delay supplied by the latter is equal to the delay necessary for the processing of the signals of outputs 77, 78 and 79 of decoding circuit 58 and for the positioning of the attenuator 60 which they control with a delay $T_4$ due to the delay device 80 in order to resupply to output terminals 73 the voice signals without the digital preamble and with an amplitude corresponding to that received at the input terminal 30 of FIG. 1.

The voice signals supplied by demodulator 45 are also detected by detection circuit 46 and then transmitted to the gain control input of amplifier 41 across one of the two integrators 48 or 49, depending on the logic state of the output signal of flip-flop 53 which controls the electronic inverter 47. When the logic control signal of electronic inverter 47 is at state 1, which is a consequence of the voice signal present in the reception chain, the output of detection circuit 46 is connected to integrator 48 which has a low time constant so that the gain control voltage can correct level fluctuations in the signal received due to temporary attenuations linked with transmission. When the logic control signal is at state 0, which is a consequence of the absence of a voice signal in the reception chain, the gain control signal traverses integrator 49 which has a high time constant, so that the gain of the amplifiers varies little during the noise reception periods.

The invention is not limited to the represented and described embodiment and in particular the output of electronic switch 13 can be connected to the output of compression means 6, rather than to the input thereof.

The coding of the amplitude of the speech levels is not limited to F.S.K. coding and any other coding system can be used.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What is claimed is:

1. A transmitter-receiver for communicating with other such devices in a communication system, for (a) transmitting by a transmitter section thereof compressed amplitude speech signal carrying information related to the mean amplitude thereof and (b) reproducing by a receiver section thereof an audio signal, the amplitude of which corresponds to the mean value of the amplitude of a speech signal transmitted with a compressed amplitude, comprising:
   a transmitter signal input;
   a transmitter coupling device coupled to said transmitter signal input;
   compression means, coupled to said transmitter coupling device for compressing in amplitude, a speech signal transmitted during a voice activity period;
   a speech modulator coupled to a signal output of said compression means for modulating a carrier signal with a compressed speech signal from said compression means;
   an alternation device for switching power and signal paths for transmit or receive mode operation and switching an antenna between said transmitter and receiver sections;
   a coding means, coupled to said transmitter signal input, for determining the mean value of a speech signal during a voice activity period and generating a coded signal for transmission as a preamble to said speech signal;
   transmitter coupling means for coupling said coded signal to the input of said compression means so as to add said preamble to the speech signal to which it corresponds;
   a transmitter control means, coupled to said transmitter signal input for controlling said transmitter coupling device, transmitter coupling means and alternation device;
   a receiver signal input, coupled to said alternation device for receiving an input signal corresponding to a signal transmitted by another transmitter-receiver;
   an amplifier for amplifying a signal from said receiver signal input;
   a demodulator for demodulating the amplified signal from said amplifier;
   an attenuator having a controlled attenuation;
   a receiver coupling device for coupling the demodulated signal from said demodulator to said attenuator;
   a decoding device for decoding a preamble indicating the mean amplitude of an associated receiver input signal;
   means for controlling the attenuation of said attenuator in accordance with the mean amplitude, as decoded; and
   receiver control means, adapted to receive a demodulated signal from said demodulator and a processed signal from said amplifier for controlling said alternation device and said receiver coupling device.

2. A transmitter-receiver according to claim 1, wherein the coding means of the transmitter comprises an analog-digital (A/D) converter having an input coupled to the transmitter signal input and an output, a device for the digital calculation of a mean amplitude value having an input coupled to the output of the A/D converter and an output and a preamble modulator having an input coupled to the output of the digital calculation device and an output coupled to the transmitter coupling means for delivering a preamble signal thereto.

3. A transmitter-receiver according to claim 2, wherein the coding means further comprises a first switch having a control input coupled to said transmitter control means, a second switch having a control input coupled to said transmitter control means, a memory having an input coupled to the output of the A/D converter, a validation input and an output, a digital calculation circuit having a first input coupled to the output of the memory through the second switch, a second input coupled to the input of the memory through the first switch and an output for coupling to the modulator.

4. A transmitter-receiver according to claim 3, wherein the transmitter control means comprise a voice activity detection device having an input coupled to the transmitter signal input and an output coupled to the validation input of the memory, a first monostable flip-flop having an input coupled to the output of the voice activity detection device and an output coupled to the control inputs of the first and second switches.

5. A transmitter-receiver according to claim 4, wherein the transmitter control means further comprises a first delay device having an input coupled to the output of the voice activity detection device and an output, as well as a second delay device having an input coupled to the output of the first delay device and an output coupled to the control input of the coupling device of the transmitter.

6. A transmitter-receiver according to claim 5, wherein the transmitter control means further comprises a third delay device, a second flip-flop having an input coupled to the output of the voice activity device across the third delay device, a zeroing input coupled to the output of the second delay device and an output, a first AND gate having a first input coupled to the output of the second flip-flop, a second input coupled to the receiver control means and an output coupled to a control input of the automatic alternation device.

7. A transmitter-receiver according to claim 6, wherein the transmitter coupling means comprises a logic circuit for generating a non-zero signal when a silence preceding a voice activity period exceeds a given duration, a second AND gate having a first input coupled to the output of the first delay device, a second input coupled to the output of the voice activity device across the logic circuit and an output, a third monostable flip-flop having an input coupled to the output of the second AND gate and an output as well as a third switch for coupling the output of the coding means to the input of the compression means, having a control input coupled to the output of the third monostable flip-flop.

8. A transmitter-receiver according to claim 1, wherein the receiver control means comprises a voice activity detection device having an input coupled to an output of the demodulator and an output coupled to the control means of the transmitter, a logic circuit having a first input coupled to the output of the voice activity device and a second input coupled to an output of the decoding circuit.

9. A transmitter-receiver according to claim 8, wherein the receiver coupling device comprises a first delay device having an input coupled to the output of the demodulator and an output, a switch having a control input coupled to the output of the logic circuit, as well as a second delay device having an input coupled to the output of the first delay device through the switch and an output coupled to the input of the attenuator.

10. In a communication system having a plurality of communication devices, each device including a transmitter and a receiver, wherein a transmitter of a first such communication device transmits an amplitude compressed speech signal, any amplitude variations of which are suppressed or completely eliminated, and wherein a receiver of a second such communication device reproduces the speech signal, the improvement comprising:
means, with the transmitter of said first communication device, for determining the mean value of amplitude of a speech signal over a voice activity period transmitted thereby; coding means for generating a coded signal representing the mean value; and means for modulating the coded signals as a preamble to the speech signal of the voice activity period transmitted thereby; and
means, within the receiver of said second communication device, for decoding the preamble and speech signal transmitted by the transmitter of said first communication device, and controlling the amplitude of the speech signal reproduced so as to accurately obtain speech corresponding in amplitude to the mean value of the speech signal as transmitted.

11. A communication device including a transmitter-receiver for use in a communication system including other such communication devices, comprising:
a transmitter for transmitting speech signals occurring during a voice activity period, said transmitter including
means for obtaining a mean value of the amplitude of the speech signal during the voice activity period,
coding means for generating a coded signal indicative of the mean value, and
means for transmitting the coded signal indicative of the mean value as a preamble to the speech signal being transmitted and from which it was derived; and
a receiver for receiving a preamble and voice activity period speech signal transmitted by another communication device of said communication system, said receiver including
means for decoding a received coded signal preamble to determine the mean value of the amplitude of the speech signal from which the preamble was derived; and
means for adjusting the amplitude of the speech signal reproduced in accordance with the mean value as decoded so as to accurately reproduce the mean value amplitude of the speech signal.

12. A transmitter-receiver according to claim 11 wherein the receiver, including said means for decoding and said means for adjusting, comprises:
a demodulator for demodulating a receiver input signal;
an attenuator coupled to said demodulator so as to receive a demodulated signal therefrom;
a decoding circuit, coupled to said demodulator so as to receive the demodulated signal therefrom and decode the preamble; and
means, coupled to said decoding circuit for controlling the attenuation of said attenuator to provide an attenuation related to the coded preamble signal.

13. A transmitter-receiver according to claim 11 further including an alternation device for (a) switching power and signal paths for transmit or receive mode operation and (b) switching an antenna between said transmitter and receiver.

14. A transmitter-receiver according to claim 11 wherein the coding means comprises
an analog to digital (A/D) converter for generating a digital words representing amplitude samples of the speech signal;
a calculating device coupled to the output of said A/D converter, for calculating the mean value of the amplitude of the speech signal; and
a modulator, coupled to said calculating device, for coding the mean value calculated as a preamble modulated onto a signal transmitted by said transmitter.

* * * * *